Figure 1:
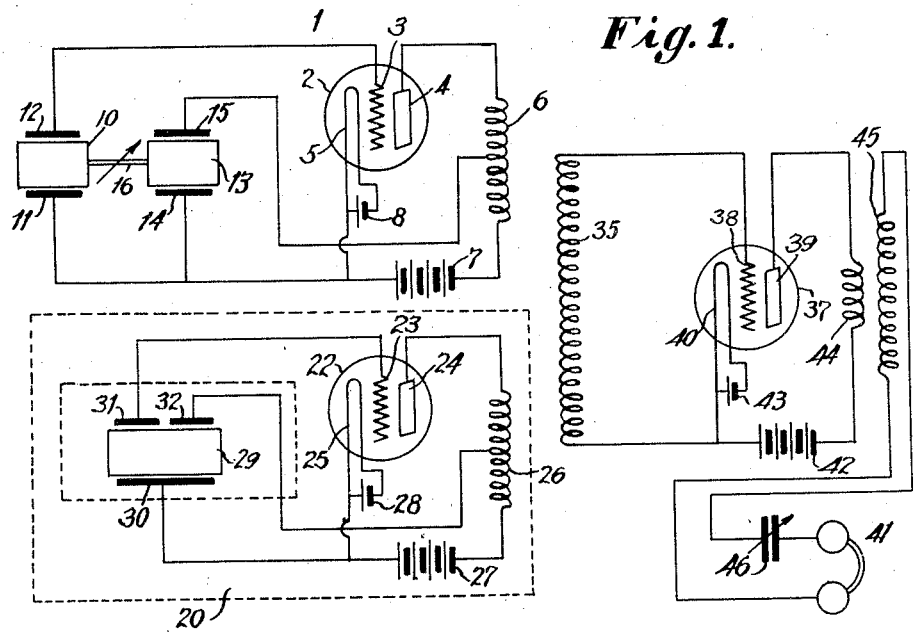

May 30, 1933.   A. McL. NICOLSON   1,912,213
STRESS MEASURING
Original Filed March 11, 1927   2 Sheets-Sheet 1

Inventor
Alexander McLean Nicolson
By John B. Brady
Attorney

May 30, 1933.  A. McL. NICOLSON  1,912,213
STRESS MEASURING
Original Filed March 11, 1927  2 Sheets-Sheet 2

Inventor
Alexander McLean Nicolson

By John B. Brady
Attorney

Patented May 30, 1933

1,912,213

UNITED STATES PATENT OFFICE

ALEXANDER McLEAN NICOLSON, OF NEW YORK, N. Y., ASSIGNOR, BY MESNE ASSIGN-
MENTS, TO WIRED RADIO, INC., OF NEW YORK, N. Y., A CORPORATION OF DELAWARE

STRESS MEASURING

Original application filed March 11, 1927, Serial No. 174,489. Divided and this application filed April 12,
1928. Serial No. 269,570.

This invention relates to a method and apparatus for measuring and determining conditions in a physical medium such as tension, compression, or deformation resulting from changes in load, changes in temperature, and the like; and more particularly to such apparatus utilizing a plurality of electrical oscillating circuits comprising piezo-electric crystal devices arranged to produce two sets of electrical oscillations which interact to produce a third set of beat frequency oscillations, the frequency of which is a determinable function of the condition to be measured, and by the measurement of which, the unknown condition may be determined.

This application is a division of my application Serial Number 174,489, filed March 11, 1927, which, on March 8, 1932, issued into United States Patent 1,848,490.

It is an object of this invention to provide a method and apparatus which may be used to determine with a high degree of accuracy conditions which might otherwise be difficult or impossible to measure or determine.

It is a further object of this invention to provide a method and apparatus for producing as a function of the unknown condition to be measured, two sets of electrical oscillations, one of which may be of constant frequency and controlled as to frequency by a piezo-electric crystal device or devices, and the other of which may vary as a determinable function of the condition to be measured, whereby beat frequency oscillations are produced by the interaction of the two sets of oscillations, the beat frequency being a determinable function of the condition to be measured; or for producing two sets of electrical oscillations both of which may vary in the opposite sense as a determinable function of the condition to be measured, thereby producing beat frequencies which vary, as a different determinable function of the condition to be measured.

It is still a further object of this invention to provide a method and apparatus for utilizing a piezo-electric device for establishing and controlling the frequency of both sets of oscillations whereby a very high degree of accuracy may be obtained in the determination or measurement of the condition to be determined or measured.

In accordance with one form of my invention, I provide a system for generating electrical oscillations, the frequency of which depends upon the condition to be measured. In its preferred form, this apparatus comprises an amplifying system of the thermionic vacuum tube type having a piezo-electric crystal system coupling the output of the amplifier system to the input thereof. The piezo-electric crystal system preferably comprises a piezo-electric crystal connected in the output circuit of said amplifying system and deriving energy therefrom; as will be understood, this crystal will vibrate mechanically in response to the impression of electrical oscillations thereon.

The above mentioned piezo-electric crystal device, which I may term the "output crystal" is mechanically coupled to a second crystal device connected in the input circuit of the amplifying system in such a manner as to communicate to the second crystal which I may term the "input crystal", the vibrations developed by the output crystal. The mechanical coupling between the crystals for transmitting the vibrations from the one to the other is such that a change in its physical condition, as for instance an increase or decrease in the tension or compression existing therein, or a change in the distance between the input and output crystals, will cause a change of the mechanical tuning of the two crystals and thereby a change of the natural frequency at which the system oscillates.

It will be understood that the device will be operated between such limits that the frequency of the oscillations generated is a determinable function of the condition to be measured.

For the purpose of determining the frequency so generated, which may be far above the limit of audibility in certain cases, I provide a second oscillation generating system, also of the thermionic vacuum tube type, and comprising a piezo-electric crystal device for establishing and controlling the frequency generated by the second system. The piezo-electric crystal device will be maintained under such conditions, if the degree of accuracy desired is such as to require it, that the piezo-electric crystal device fixing the frequency of the second oscillating system may be maintained at a constant temperature, pressure and degree of humidity, to assure that the frequency of the second system is truly constant. The oscillation produced by the first and second systems may be caused to interact to produce beat frequency oscillations which may be selected and amplified and eventually detected: It will be understood that the frequency of these beat frequency oscillations will be an indication, or in other words, a determinable function of the unknown condition to be determined, and when the system is once calibrated, it will be possible to determine the unknown condition merely by tuning a selecting circuit such as a wave meter to the frequency of the beat oscillations and noting the position of the tuning elements.

My invention lends itself readily to the determination of many unknown conditions: For example, the loads in all sorts of structural members may be determined, either within or beyond the elastic limit, and it may be determined when such structural members are being loaded to a dangerous point. If desired, relays may be provided, arranged to operate when the elastic limit is approached in such members, thereby giving a warning of dangerous conditions. Temperatures may be determined at any desired time at points which may be relatively inaccessible. In fact, it will be clear such a system lends itself to the determination and measurement with a high degree of accuracy of many physical conditions in physical mediums.

In accordance with another and in some instances preferred form of my invention, instead of utilizing a pair of oscillating systems, one of which generates oscillations of constant frequency and the other oscillations of a frequency which is a determinable function of the condition to be measured, I may utilize a single amplifying system generating simultaneously oscillations of different frequencies, one of which may be constant and the other of which may vary as a determinable function of the condition to be measured, or, both of which may vary in the opposite sense as a determinable function of the condition to be measured. In this instance, I prefer to utilize an amplifying system of thermionic vacuum tube type, having its output circuit coupled to its input circuit by means of two different piezo-electric systems, each piezo-electric system comprising a piezo-electric crystal associated with the output circuit, and a piezo-electric crystal associated with the input circuit, and a mechanical coupling between them, subject to variation, as a function of the condition to be measured. The variation of the coupling, as previously pointed out, will cause a change in the natural frequency of each of the systems and thereby a change in the frequency of each of the sets of oscillations.

If a force dependent upon the conditions to be measured be applied to these couplings, such that it has the opposite effect in the two couplings, then the two frequencies will vary in the opposite sense. For example, if one of the couplings comprises a member adapted to be compressed, while the other coupling comprises a member adapted to be placed under tension, in accordance with the unknown condition, which may be the case if the two couplings are arranged as cross members in a ring of elastic material and disposed at right angles at each other, then the frequencies generated by the system will vary in opposite senses when the ring is subjected to compression or tension along the line of one of the cross members.

Referring now more particularly to Fig 1, 1 designates a variable frequency oscillator comprising an amplifying system 2 of the thermionic vacuum tube type diagrammatically shown as a single vacuum tube device comprising grid or control electrode 3, anode or plate 4, and cathode or filamentary cathode 5. A suitable coil 6 is connected to the anode 4 on the one hand and to a suitable source of potential such as battery 7 on the other hand.

The filament 5 is energized by a suitable source such as battery 8. A piezo-electric crystal device 10 such for example as a crystal of Rochelle salt exhibiting the "hour glass" configuration, a crystal of quartz or any other suitable crystal, is provided with electrodes 11 and 12 arranged as may be desired, electrode 11 being connected to the filament system, and electrode 12, being connected to the control electrode 3.

The crystal device 10 with its electrodes 11 and 12 constitute the input crystal of the variable frequency oscillator 1. The output crystal 13, which may be similar to the input crystal, is provided with electrodes 14 and 15; one of which is connected to the filament circuit and the other of which is connected to an intermediate point upon the coil 6.

It will be understood that proper adjustment of the point of connection of electrode 15 to coil 6 and of the various potentials and phase relations, will cause the generation of sustained oscillations, the frequency of which is a function of the natural period or periods of the crystals 13 and 10 and of the coupling therebetween. If the coupling is such as to vary under the control of the unknown condition to be determined, then the natural frequency at which the system will oscillate, will be a function of the unknown condition. Certain preferred forms and arrangements of the variable coupling will hereafter be described in more detail.

The frequency of the oscillations generated by the system 1, may be one of the wide range including audible frequencies and super-audible frequencies.

For convenience and accuracy in the determination of the frequency of the oscillations produced by the system 1, I preferably provide a second oscillation generating system 20 adapted to generate oscillations of a constant frequency, which may be so chosen as to interact with the oscillations produced by the system 1 to produce oscillations of audible beat frequency, which may be detected and readily meaured as to pitch or frequency. For the purpose of providing oscillations of the constant frequency required, I preferably provide a second vacuum tube amplifying system diagrammatically shown as a vacuum tube amplifier 22 having a control electrode or grid 23, an anode or plate 24, and a filamentary cathode 25. Coil 26 is connected in the output circuit as before, on the one hand to the plate 24 and on the other hand to a suitable source such as battery 27, and the filament is heated by a suitable source, such as battery 28.

A piezo-electric crystal device 29 is provided, having a common filament electrode 30, and a pair of separated electrodes 31 and 32. The electrode 31 is connected to the grid or control electrode 23 and the electrode 32 to a suitable intermediate point upon the coil 26.

It will now be understood that by proper adjustment of the various constants, the amplifying system 20 will generate sustained oscillations of a frequency determined and controlled by the crystal device 29 and in order to assure that the frequency does not vary, the crystal device may be maintained under constant temperature, pressure, and humidity if desired.

While I have shown a single crystal device 29, it will be clear that separate crystal devices, connected by a suitable mechanical or electrical coupling may be utilized.

For the purpose of determining the frequency of the beat frequency oscillations produced by interaction of the oscillations generated by the systems 1 and 20, there may be provided a detecting and indicating system comprising coil 35 disposed in inductive relation with the coil 6 and 26; a suitable detecting device such for example as vacuum tube detector 37 may be provided having its control electrode 38 connected to one terminal of coil 35 and its filament 40 connected to the other terminal thereof. The anode 39 may be connected through a suitable coil 44 and a suitable source of potential 42 to the filament circuit. The filament may be energized by suitable battery 43. A suitable coil 45 may be coupled to coil 44, and connected through tuning condenser 46 and suitable indicator such as telephone receivers 41 whereby the system may be tuned to the beat frequency.

It will be understood, however, that in place of the vacuum tube detector 37, a suitable crystal or other detector may be substituted.

It will now be clear that if the systems 1 and 20 be adjusted to produce oscillations which differ from each other by frequencies within the range of audibility, then the frequency oscillations may be determined by tuning the circuit comprising coil 45 and condenser 46 to obtain the maximum response in the indicator 41; and if the frequency of the oscillations changes the system 1 varies as a result of the changes in the coupling 16, and the pitch of the beat frequency oscillations will change in a corresponding manner.

If the apparatus is first calibrated, a chart or curve may be prepared showing the value of the unknown condition and the setting of the tuning circuit corresponding thereto. After this is once obtained, in order to measure the unknown condition, it is only necessary to tune the selection circuit and to observe the setting of the tuning elements. By referring to the chart or curve the unknown condition may be determined.

Figure 2:
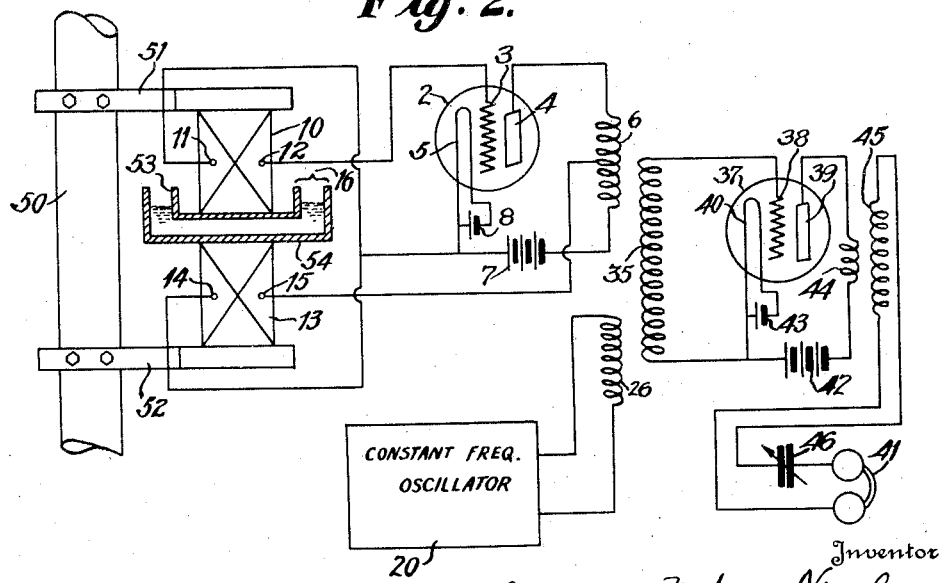

Referring now more particularly to Fig. 2, I have shown in detail, one form of variable coupling 16, as well as the use of the system for measuring expansion and contraction in a member, due to a load or temperature changes. In this instance, 50 designates a member to be observed: 51 and 52 respectively are top and bottom brackets clamped thereto and carrying crystal device 10 and 13 respectively. A suitable cup 53, which I term a top cup is secured to the under side of the crystal device 10, and a suitable cup 54 which I term bottom cup is secured to the upper side of the crystal device 13. The cups 53 and 54 are so chosen and arranged as to fit one within the other, leaving a space between the bottom of the respective cups and also between the upturned edges. This space is partly filled with a suitable liquid such as mercury, oil, glycerine, gelatine, or the like, to a point such that the liquid extends up into the annular chamber between the upturned edges of the cups.

If now, the distance between the brackets 51 and 52 be changed as a result of tension or compression applied to the member 50, or as a result of temperature changes, the distance between the cups will be changed:

The distribution of the liquid will be changed, and a change will be caused in the natural frequency of the coupling 16, resulting in a change of the frequency of oscillations generated by the system 1, which may be measured and interpreted as already described.

Figure 3:
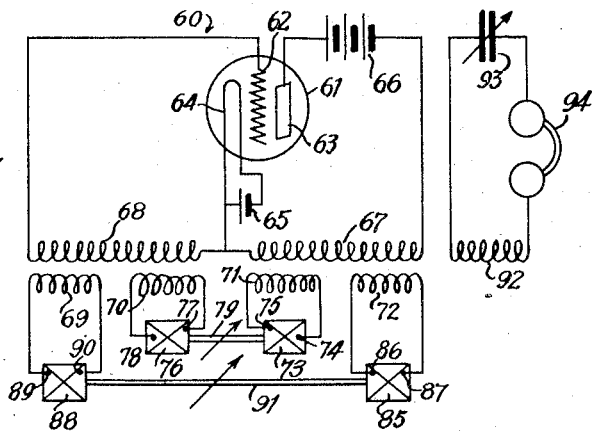

Referring now more particularly to Fig. 3 I have shown a modified form of my invention, in which a single vacuum tube amplifying system 60 is arranged to generate oscillations of a plurality of frequencies simultaneously, the frequency of each group being caused to vary in the opposite sense as a function of the condition to be determined. In this instance, the oscillator comprises a thermionic vacuum tube amplifier 61, having control electrode 62, and filamentary cathode 64 energized by a suitable source of potential such as battery 65. A suitable source of potential 66 is connected to the anode 63, the other terminal of which is connected to a suitable coil 67, the other terminal of which is connected to the filament system. The input circuit comprises coil 68 connected between the control electrode 62 and the filament 64. The series of coils 69, 70, 71 and 72 are provided, the coils 69 and 70 being coupled to coil 68, and the coils 71 and 72 being coupled to coil 67. Coil 71 is arranged to deliver energy to electrodes 74 and 75 of a suitable piezo-electric crystal device 73. As will be understood, the piezo-electric crystal device will thereby be set into mechanical vibrations at a natural frequency depending upon the size, shape, and material of the crystal device, and the coupling 79. The vibrations developed in the crystal device 73 are transmitted through the variable coupling 79 to crystal device 76 provided with electrodes 77 and 78 and connected to coil 70.

The vibrations of the crystal device 76, as will be understood, causes the production of charges upon the electrodes 77 and 78, which are fed back to the input circuit of the amplifying system: By the proper adjustment of the constants, continuous oscillations will be produced by the amplifying system the frequency of which is determined by the constants of the piezo-electric crystals 73 and 76 and constants of the coupling 79.

If the coupling is controlled as a function of the condition to be measured, the frequency of the oscillations generated through the crystal devices 73 and 76 will be a function of the condition to be measured.

In a similar manner, crystal device 85 provided with electrodes 86 and 87 connected to coil 72, drives crystal device 88 through the operation of the variable coupling 91. The operation of the crystal device 88 causes the production of charges upon electrodes 89 and 90, which are transmitted to the coil 69 and thence to coil 68 into the amplifying system.

It will be understood that the system is thereby generating two sets or groups of oscillations simultaneously, the frequency of each set being a function of the corresponding piezo-electric crystal systems. If the variable couplings 79 and 91 are both variable in the same sense as a function of the unknown condition, the frequency of both sets of oscillations generated will likewise vary in the same sense. However, if the frequency of one coupling is caused to increase with the condition to be determined, while the frequency of the other coupling is caused to decrease, the oscillation frequencies similarly change, and a relatively large change in beat frequency may be caused to appear by a relatively small change in the condition to be measured.

As is well understood in the art, the amplifying system 61, may at the same time, operate as a detector without affecting the operation as a generator, as a result of which, coil 92 may be provided inductively associated with coil 67 or with coil 68, and comprising in circuit therewith a tuning device such as variable condenser 93 and an indicator such as telephone receivers 94, by means of which the frequency of the beat currents may be established.

Figure 4:
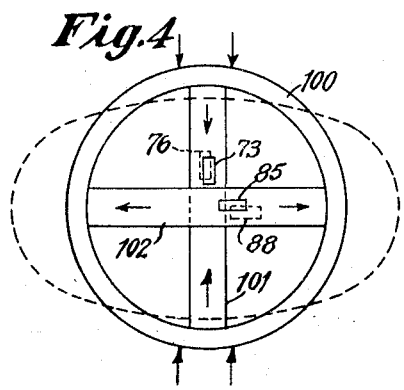
Figure 5:
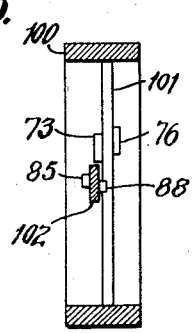

Referring now more particularly to Fig. 4, I have shown an arrangement adapted to convert the unknown condition to be measured into forces affecting the variables couplings 79 and 91 in the opposite sense. There may be provided a suitable stress ring 100 of any suitable material such for example as steel. The ring 100 may be provided with a pair of cross members 101 and 102 disposed at right angles to each other and secured in position within the ring in such manner that stresses applied thereto are transmitted to the cross members.

In the arrangement shown, crystal device 73, may be secured upon one side of the cross member 101, while crystal device 76 is secured upon the opposite side thereof. Similarly, crystal device 85 may be secured upon one side of the cross member 102 while crystal device 88 is secured upon the other side thereof. In this arrangement, the cross member 101 will then constitute the variable coupling 79, and the cross member 102 the variable coupling 91. If now, compression be applied to the ring along the diameter of the cross member 101, said cross member will be placed under compression while the opposite cross member will be subjected to tension, as a result of the deformation of the ring 100 into the shape shown by the dotted lines, greatly exaggerated for the purpose. If on the other hand, the ring be subjected to tension along the diameter of the cross member 101, the said cross member will be subjected to tension and the cross member 102 placed under compression: While, if the force be applied along a line bisecting the angle between the said cross members, both will be caused to vary in the same sense, that is, both will be placed under tension of compression.

Figure 6:
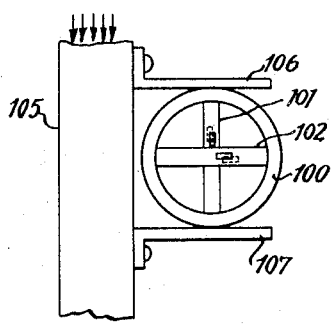

Referring now to Fig. 6, 105 designates a member similar to the member 50 of Fig. 2, the conditions in which are to be measured. A pair of spaced brackets 106 and 107 are securely fastened to the member 105 in the proper spaced relation to receive the ring 100. It will now be apparent that if the ring is placed in the position shown in Fig. 6 and secured therein, changes in spacing between the brackets 106 and 107 will cause stress variations in the opposite sense in the cross members 101 and 102, and thereby variations in the beat frequency produced by the system. By calibrating the apparatus, it will then be possible to determine very minute changes in the condition of the load, temperature, etc., in the member 105.

While I have shown and described certain preferred embodiments of my invention, it will be understood that modifications and changes will be made without departing from the spirit and scope thereof, as will be understod by those skilled in the art.

What I claim as new and desire to secure by Letters Patent of the United States is as follows:

1. In a measuring system, a measuring member, a thermionic system for generating oscillations, means comprising a pair of piezo-electric elements for controlling the frequency of said oscillations, a source of electrical oscillations of constant frequency, means for applying said piezo-electric elements to said measuring member in such manner that said elements are mechanically coupled by a portion of said measuring member, and means for measuring the difference between said controlled frequency and said constant frequency.

2. The method for varying the frequency of a generator of electrical oscillations, the frequency of which is controlled by two piezo-electric devices and a mechanical coupling there between, which comprises varying said mechanical coupling.

3. In a piezo-electric apparatus the combination of, two piezo-electric devices disposed one above the other, a cup in contact with the lower piezo-electric device adapted to hold a liquid therein, and means in contact with the upper piezo-electric device adapted to displace part of the liquid in said cup, whereby said liquid provides coupling means between said piezo-electric devices.

4. A measuring system comprising, two piezo-electric elements, means attached to said elements for holding a liquid therebetween, said liquid providing mechanical coupling means with variable pressure effects between said elements, means for securing said elements respectively to spaced points in a structure whereby changes in a physical dimension of said structure cause corresponding changes in said coupling means, means for generating electrical oscillations, means for controlling the frequency of said oscillations by the variations in said coupling means and means for measuring said changes in frequency whereby the changes in said structure may be determined.

5. In a piezo-electric apparatus, the combination of a plurality of piezo-electric crystal elements and means including a liquid for mechanically coupling said crystal elements and for varying the pressure effects therebetween.

6. In a measuring device, an oscillator circuit, a plurality of piezo-electric elements responsive thereto, means for holding each of said elements in fixed relation to a certain portion of a member a physical characteristic of which is to be measured, a container, a liquid held therein and disposed between said piezo-electric elements, and means for displacing some of said liquid due to variations in a physical characteristic of said member, whereby the pressure upon and consequent degree of coupling between said piezo-electric elements is varied and changes in the oscillator circuit are effected.

7. A piezo-electric oscillator comprising means for generating electrical oscillations, said means including two piezo-electric elements connected in the circuits of said oscillator and a device for mechanically coupling said elements and for controlling the frequency thereof, means for varying the frequency of said oscillator by variations in said mechanical coupling, dimension measuring means for varying the mechanical coupling between said elements, and means for calibrating the frequency variations of said oscillator to the desired units of measurement.

8. The method of measuring a physical characteristic of a body in terms of resultant frequency variation of an electrical oscillation generator having a pair of mechanically coupled piezo-electric crystals the natural frequencies of which are affected by a change in the physical characteristic of said body, which comprises subjecting said crystals to such variation of mechanical coupling as is a determinable function of the variation of the physical characteristic of the body being measured, and comparing the resultant frequencies with a known constant frequency.

In testimony whereof I affix my signature.

ALEXANDER McLEAN NICOLSON.